(12) United States Patent
Morris

(10) Patent No.: US 9,173,377 B2
(45) Date of Patent: Nov. 3, 2015

(54) FEEDER COVER

(71) Applicant: Glenn Morris, Burnet, TX (US)

(72) Inventor: Glenn Morris, Burnet, TX (US)

(*) Notice: Subject to any disclaimer, the term of this patent is extended or adjusted under 35 U.S.C. 154(b) by 4 days.

(21) Appl. No.: 14/458,973

(22) Filed: Aug. 13, 2014

(65) Prior Publication Data

US 2015/0047568 A1 Feb. 19, 2015

Related U.S. Application Data

(60) Provisional application No. 61/865,906, filed on Aug. 14, 2013.

(51) Int. Cl.
*A01K 5/02* (2006.01)

(52) U.S. Cl.
CPC ............. *A01K 5/0291* (2013.01); *A01K 5/0225* (2013.01)

(58) Field of Classification Search
CPC ... A01K 39/01; A01K 39/014; A01K 5/0225; A01K 5/0291
USPC ............ 119/51.01, 51.11, 57.91, 57.92, 61.1, 119/61.2, 61.3, 61.31
IPC ............... A01K 5/00, 5/01, 5/02, 39/01, 39/014
See application file for complete search history.

(56) References Cited

U.S. PATENT DOCUMENTS

| | | |
|---|---|---|
| 2,654,557 A | 10/1953 | Henderson |
| 3,195,508 A | 7/1965 | Lehman et al. |
| 3,212,671 A | 10/1965 | Rock |
| 3,372,958 A | 3/1968 | Black |
| 3,659,748 A | 5/1972 | Beck |
| 3,742,913 A * | 7/1973 | Crippen ..................... 119/51.11 |
| 3,799,622 A | 3/1974 | Hek |
| 4,200,826 A | 4/1980 | Calusio |
| 4,311,492 A | 1/1982 | Eltvedt |
| 4,339,232 A | 7/1982 | Campbell |
| 4,376,451 A | 3/1983 | Bouron et al. |
| 4,491,086 A | 1/1985 | Croteau |
| 4,501,518 A | 2/1985 | Smith |

(Continued)

FOREIGN PATENT DOCUMENTS

DE 3728030 A1 3/1989

OTHER PUBLICATIONS

United States Patent and Trademark Office, Non-Final Office Action, U.S. Appl. No. 13/205,887, dated Jan. 30, 2014.

(Continued)

*Primary Examiner* — Lisa Tsang
(74) *Attorney, Agent, or Firm* — Kelly Kordzik; Matheson Keys & Kordzik PLLC

(57) ABSTRACT

An animal feeder includes a feed container containing animal feed for use in spreading the animal feed onto the ground over which the animal feeder is positioned. A housing moves between open and closed positions, wherein the closed position, the housing is positioned so that it substantially encloses a motorized animal feed dispenser positioned in proximity to a hole in the feed container through which the animal feed passes from the container. In the closed position, the sides of the housing completely block the dispensing of the animal feed onto the ground. In an open position, the housing is positioned so that the motorized animal feed dispenser is exposed for dispensing of the animal feed onto the ground. Also, in the closed position, physical access from outside of the housing to the animal feed residing on the animal feed dispenser and through the hole is prevented.

20 Claims, 8 Drawing Sheets

(56) References Cited

U.S. PATENT DOCUMENTS

| | | | |
|---|---|---|---|
| 4,527,714 | A | 7/1985 | Bowman |
| 4,700,861 | A | 10/1987 | Neward |
| 4,812,086 | A | 3/1989 | Kopernicky |
| 5,033,914 | A | 7/1991 | Wuertele et al. |
| 5,143,289 | A * | 9/1992 | Gresham et al. .................. 239/7 |
| 5,248,429 | A | 9/1993 | Larsen |
| 5,299,529 | A | 4/1994 | Ramirez |
| 5,333,572 | A * | 8/1994 | Nutt ........................... 119/57.91 |
| 5,370,080 | A | 12/1994 | Koepp |
| 5,791,830 | A | 8/1998 | Fort et al. |
| 5,820,035 | A * | 10/1998 | Johnson et al. ............... 239/684 |
| 5,899,169 | A | 5/1999 | Jenson |
| 5,926,441 | A | 7/1999 | Zinsmeyer et al. |
| 6,082,300 | A | 7/2000 | Futch |
| 6,321,874 | B1 | 11/2001 | Miyamoto |
| 6,341,628 | B1 | 1/2002 | Burson |
| 6,622,653 | B1 | 9/2003 | Starnes, Jr. |
| 6,827,529 | B1 | 12/2004 | Berge et al. |
| 7,175,103 | B1 | 2/2007 | Barley |
| 7,178,481 | B1 | 2/2007 | Friesenhahn, Jr. et al. |
| 7,275,501 | B1 | 10/2007 | Laceky |
| 7,306,175 | B1 * | 12/2007 | Farmer ......................... 239/666 |
| 7,631,614 | B2 * | 12/2009 | Romeu Guardia ............. 119/54 |
| 8,074,602 | B2 | 12/2011 | Laliberte |
| 8,397,675 | B2 | 3/2013 | Morris |
| 8,555,812 | B2 | 10/2013 | Nowacek |
| 8,833,303 | B1 * | 9/2014 | Linder ....................... 119/57.91 |
| 2002/0185075 | A1 | 12/2002 | Glover et al. |
| 2005/0205602 | A1 | 9/2005 | Schmidt |
| 2007/0039553 | A1 | 2/2007 | Friesenhahn, Jr. et al. |
| 2008/0029034 | A1 | 2/2008 | Busbice et al. |
| 2009/0020073 | A1 | 1/2009 | Hansen |
| 2009/0205573 | A1 * | 8/2009 | Briere ........................ 119/57.91 |
| 2010/0162960 | A1 | 7/2010 | Moon |
| 2011/0297091 | A1 | 12/2011 | Chamberlain et al. |
| 2012/0085288 | A1 | 4/2012 | Salinas et al. |
| 2012/0085289 | A1 * | 4/2012 | Quiring et al. ............. 119/57.91 |
| 2013/0186342 | A1 | 7/2013 | Salinas et al. |

OTHER PUBLICATIONS

United States Patent and Trademark Office, Non-Final Office Action, U.S. Appl. No. 11/550,310, dated Jan. 18, 2012.

United States Patent and Trademark Office, Final Office Action, U.S. Appl. No. 11/550,310, dated Dec. 19, 2011.

United States Patent and Trademark Office, Non-Final Office Action, U.S. Appl. No. 11/550,310, dated Apr. 11, 2011.

United States Patent and Trademark Office, Final Office Action, U.S. Appl. No. 11/550,310, dated Nov. 2, 2009.

United States Patent and Trademark Office, Non-Final Office Action, U.S. Appl. No. 11/550,310, dated Jun. 24, 2009.

* cited by examiner

US 9,173,377 B2

FEEDER COVER

This application claims priority to U.S. Provisional Patent Application Ser. No. 61/865,906, which is hereby incorporated by reference herein.

TECHNICAL FIELD

The present invention relates generally to the field of bulk storage and transfer of materials, and more particularly, to the transfer of bulk materials from a storage device, such as the transfer of animal feed.

BACKGROUND

Deer hunting is a multi-million dollar sport, with some of the most expensive equipment and gear. For many years, hunters have utilized automatic deer feeders, which are timed to disperse various types of deer feed, such as corn, out of a container onto the ground to attract the deer to a desired hunting location. Similar feeders are also used on farms and ranches to automatically feed livestock at designated times.

Generally, such feeders comprise a large barrel-like container in which the feed is stored, where the container is raised many feet from the ground through the use of tripod stilts or hung from a tree. At the bottom of the feed barrel, there is a hole through which the feed drops onto a timed and motorized dispenser, which is activated at desired times during the day and has a rotating fan-like mechanism to disperse the feed over a large area on the ground around where the feeder is located.

A problem with such feeders is that the motorized dispenser and the hole in the storage container are exposed even when not in use. Such exposure allows animals, such as squirrels and raccoons, access to the feed causing more feed to come out, thus causing waste.

Moreover, moisture and humidity are leading problems in such feeders, including protein feeders for cattle and other livestock, wherein the moisture and humidity causes certain feeds to clump in large chunks, thus fouling the feeder mechanism and clogging the hole at the bottom of the feeding barrel, preventing the feeder from satisfactorily spreading the feed externally from the storage barrel, or from being dispensed from a protein feeder.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description is not intended to limit the scope of the invention, as claimed, but is presented for purposes of illustration only and not limitation to describe the features and characteristics of the present invention, and to sufficiently enable one skilled in the art to practice the invention.

The singular forms "a," "an," and "the" include plural referents unless the context clearly dictates otherwise. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Figure 1:
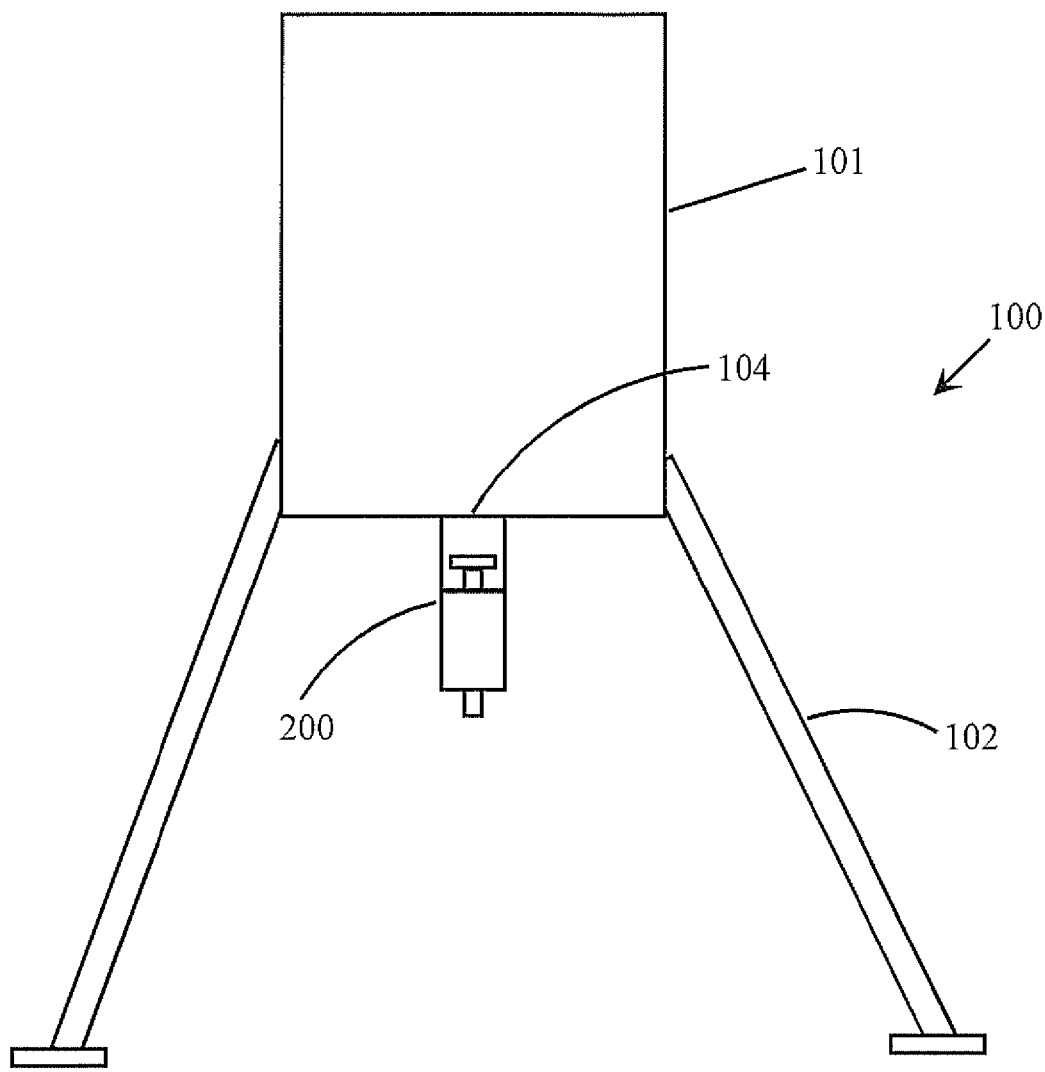
FIG. 1 illustrates an animal feeder configured in accordance with embodiments of the present invention.

FIG. 1 illustrates a feeder 100 configured in accordance with embodiments of the present invention. A feed barrel or container 101 is raised from the ground on legs or stilts 102. Alternatively, such a feed barrel 100 could be hung from a tree or other apparatus including a man-made apparatus, as is known in the art. Such other embodiments are not shown, but are understood to be within the scope of the present invention.

Though not described in any further detail, feeder 100 includes a dispensing mechanism 200, which dispenses the feed 220 contained within the feed container 101 as it falls through a hole 104, as is known in the art.

Figure 2:
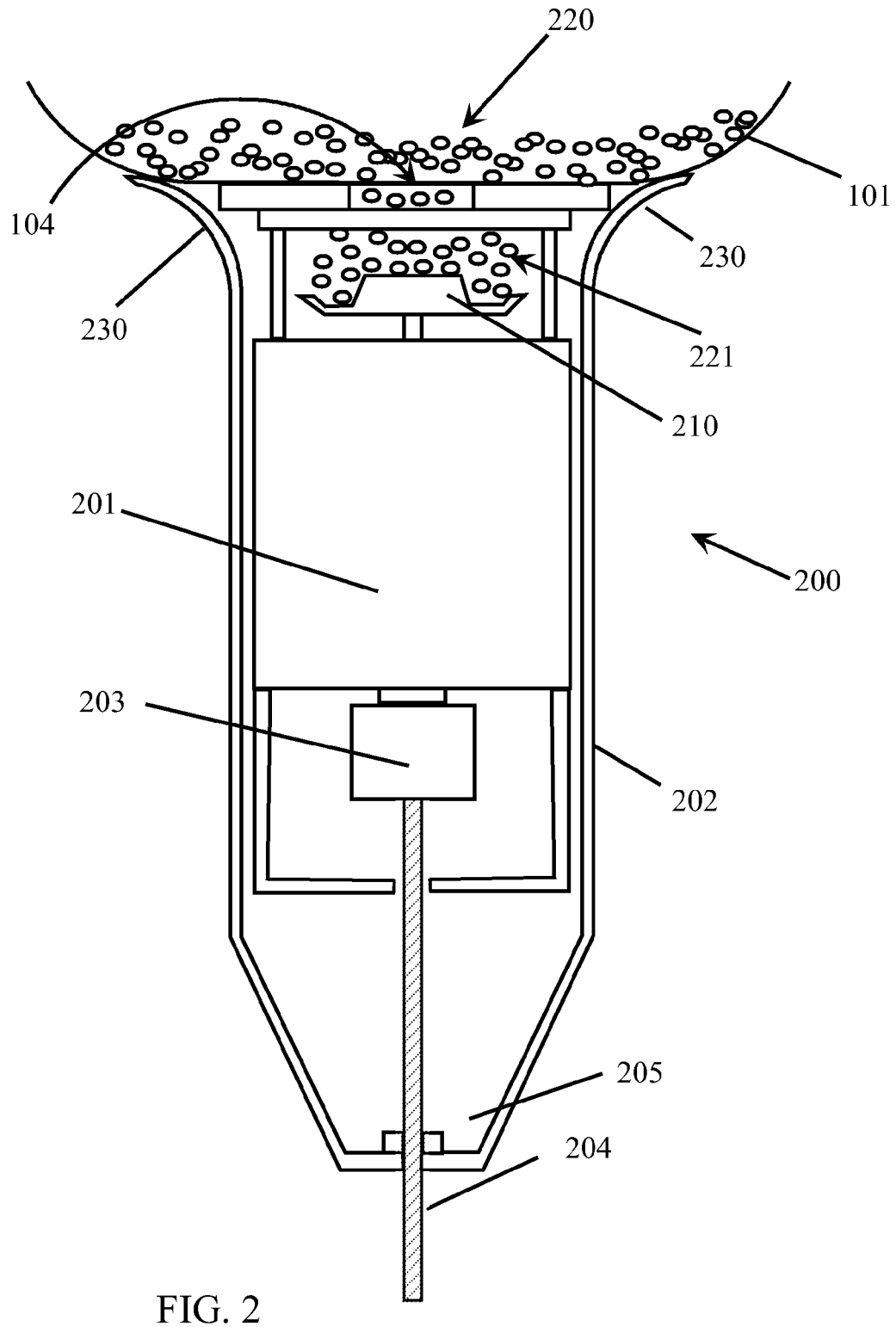
FIG. 2 illustrates a partial cross-section of an embodiment of the present invention configured in a closed position.

FIG. 2 illustrates a partial cross-section of an embodiment of the dispensing mechanism 200 shown in a closed position. Only a bottom portion of the feed container 101 is illustrated in this figure. As described previously with respect to FIG. 1, animal feed 220 will be stored inside the feed container 101, and will pass through a hole 104 in the bottom of the feed container 101 landing on a platform of a feed spreading motorized dispenser 210, which may revolve/spin at a relatively high speed under the control of the feeder control unit 201 when the feeder control unit 201 determines according to its programming that the motorized dispenser 210 is to be in operation.

As can be seen in FIG. 2, some of the feed 221 has fallen through the hole 104, and resides on the platform of the motorized dispenser 210. However, because the housing 202 is raised to enclose the area in the vicinity of the platform of the motorized dispenser 210, animals (e.g., squirrels, raccoons) are unable to physically access the feed 221 and/or manually spin or revolve the platform 210, which in turn would cause more of the feed 220 to fall through hole 104 and be accessible as feed 221 for such animals. Moreover, the housing mitigates the clumping of the feed 220 at and near the hole 104 due to the effects of humidity and/or moisture.

Coupled to the feeder control unit 201 is an electric motor 203, which may be powered by an electrical storage unit, such as a battery (not shown), inside the feeder control unit 201. Operation of the electric motor 203 may be performed in conjunction with a timing mechanism that is programmed into the feeder control unit 201 for spreading the animal feed by the spinning of the motorized dispenser platform 210. A separate electric motor (not shown) within the feeder control unit 201 may be utilized to revolve/spin the dispenser platform 210.

Figure 5:
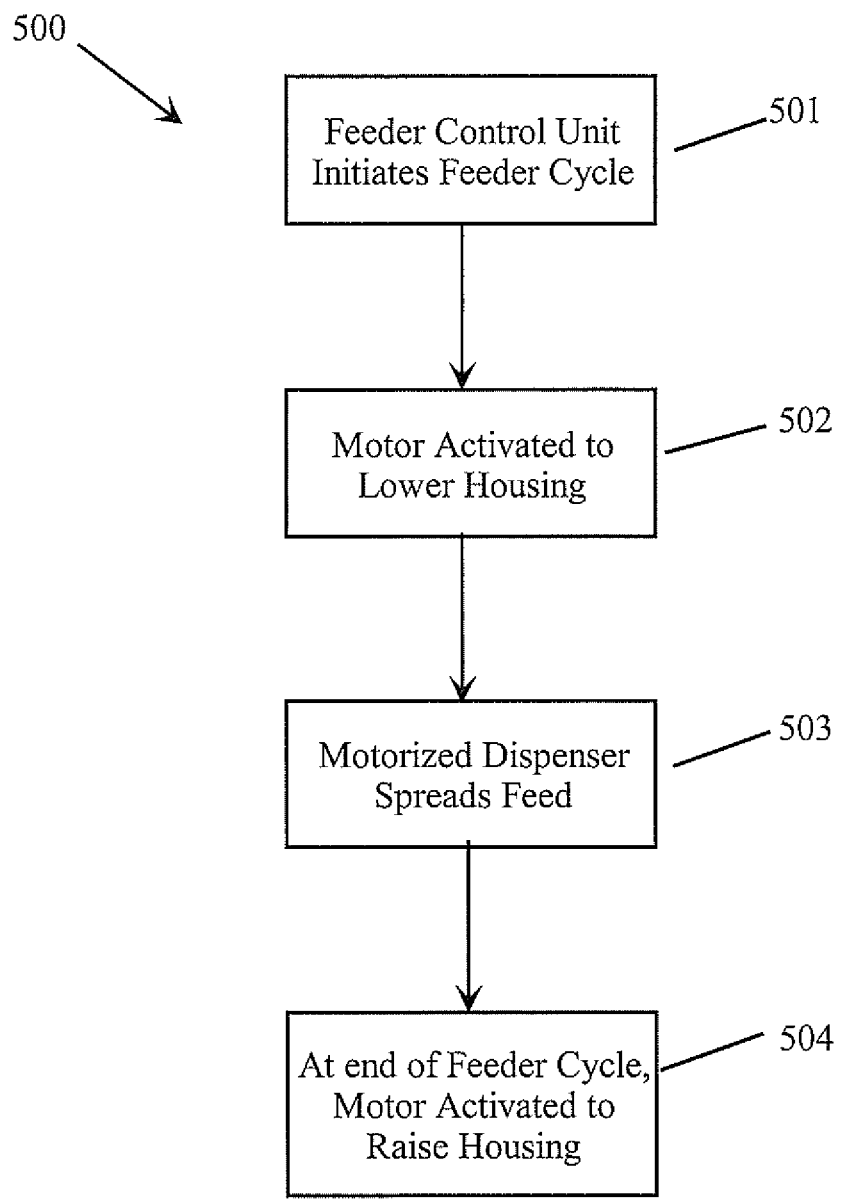
FIGS. 5-6 illustrate processes configured in accordance with embodiments of the present invention.

Referring to FIG. 5, there is illustrated a simplified flow diagram of a process 500 for operating and controlling embodiments of the present invention. Such a process 500 may be implemented within the feeder control unit 201 utilizing mechanical and/or electrical and/or electronic mechanisms. For example, as will be further described with respect to FIG. 7, timing, operation, and control of the process 500 may be implemented with a data processing system, such as a programmed computer/controller. The process 500 may begin in step 501 with the feeder control unit 201 initiating a feeder cycle in which it is programmed for spreading the animal feed 221 externally from the feeder 100, such as onto the surrounding ground. In step, 502, the electric motor 203 is activated to lower the housing 202. The motor 203 operates to turn a thread 204 (e.g., an ACME threaded rod), which is threaded through a matching nut 205 (e.g., an ACME nut) affixed to the bottom of the housing 202. Coupling of the thread 204 to the electric motor 203 may be accomplished in any well-known manner, including but not limited to, one or more interlocking gears (not shown).

Figure 3:
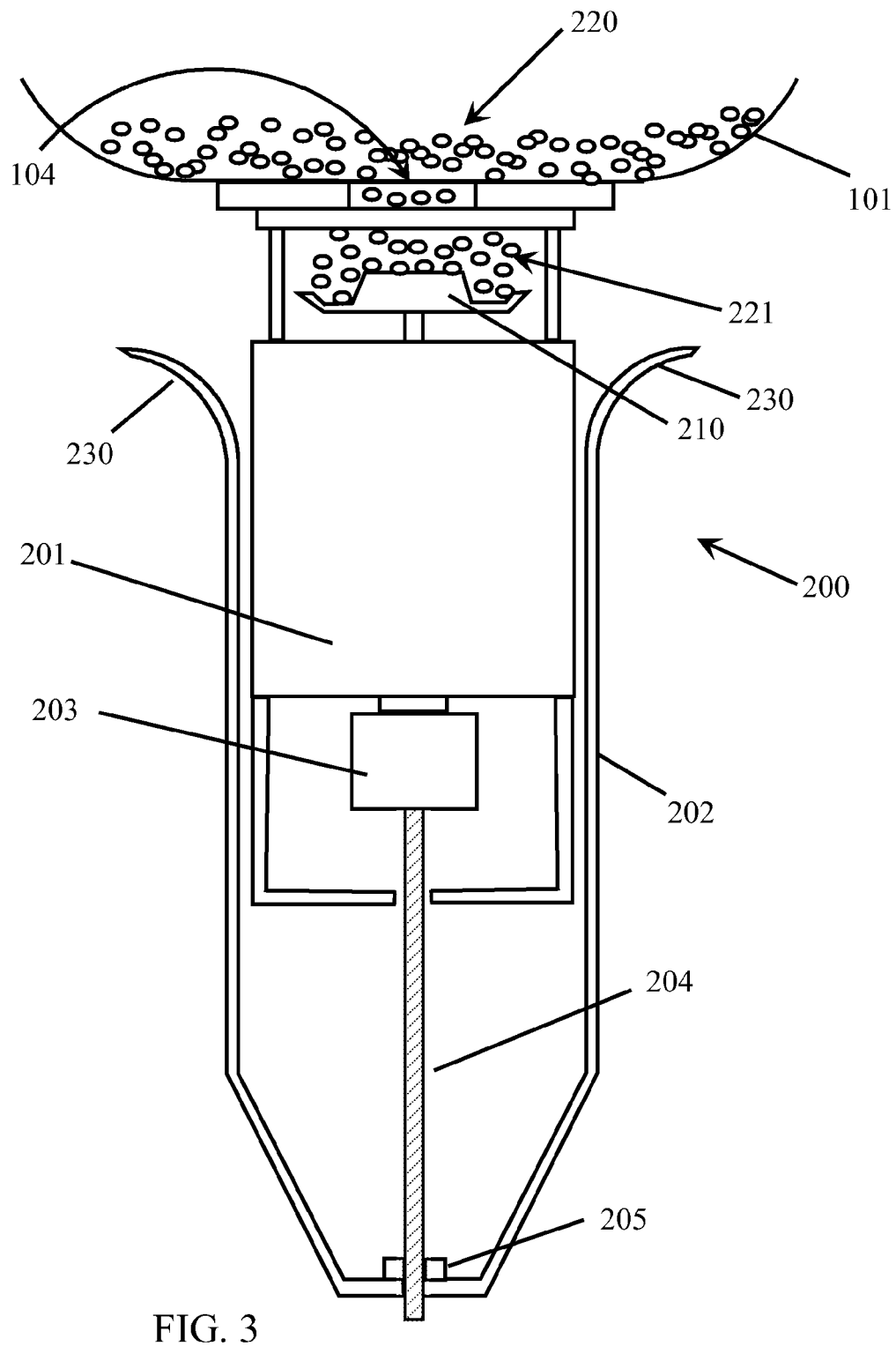
FIG. 3 illustrates a partial cross-section of an embodiment of the present invention in an open position.

As the ACME threaded rod 204 is turned, this will cause the entire housing 202 to begin descending, which will expose the motorized dispenser platform 210, as further illustrated in FIG. 3, which shows the dispensing mechanism 200 shown in an open position. Once the motorized dispenser platform 210 is exposed, in step 503, the feeder control unit 201 will cause it to begin spinning in order to spread the animal feed 221 falling through the hole 104 externally from the feed container 101. Once the feeder control unit 201 determines that the spreading of animal feed 221 is to be discontinued (e.g., in response to the end of a predetermined time period), in step 504, it will stop the spinning of the motorized dispenser platform 210, and cause the motor 203 to operate in a reverse direction, which turns the ACME threaded rod 204 in an opposite direction, thus lifting the entire housing 202 until it substantially encloses the previously exposed motorized dispenser platform 210 and the hole 104 as the ends 230 of the housing 202 substantially, or completely, rest against the feed container 101, as further illustrated in FIG. 2. The ends 230 may have a gasket (e.g., rubber, leather, etc.) to provide an additional seal against the bottom of the container 101.

It should be noted that the housing 202 is illustrated in a cross-sectioned manner in order to show the motorized dispenser platform 210, feed control unit 201, and motor 203, which are all contained inside the housing 202, which may be of a cylindrical, rectangular, or other geometrical shape.

Figure 4A:
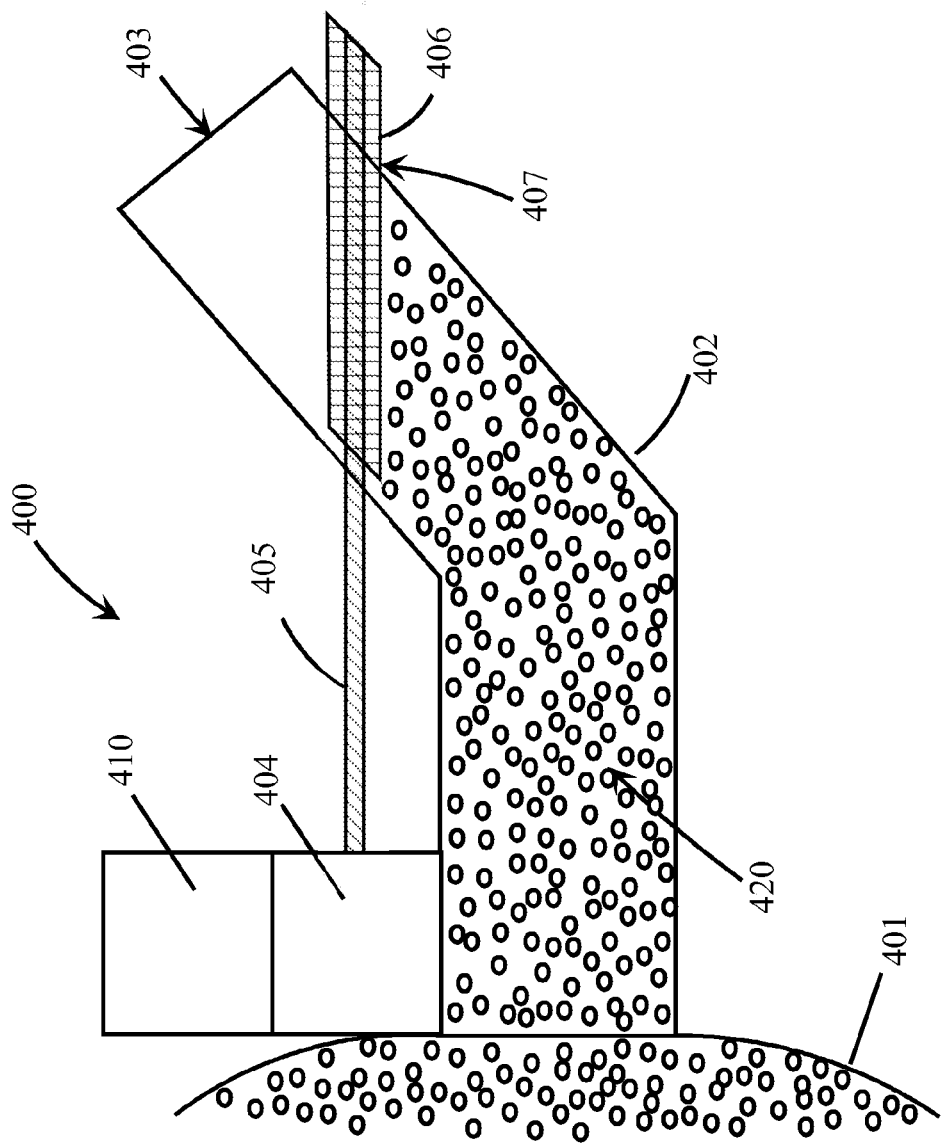
FIGS. 4A-4B illustrate an animal feeder configured in accordance with embodiments of the present invention.
Figure 4B:
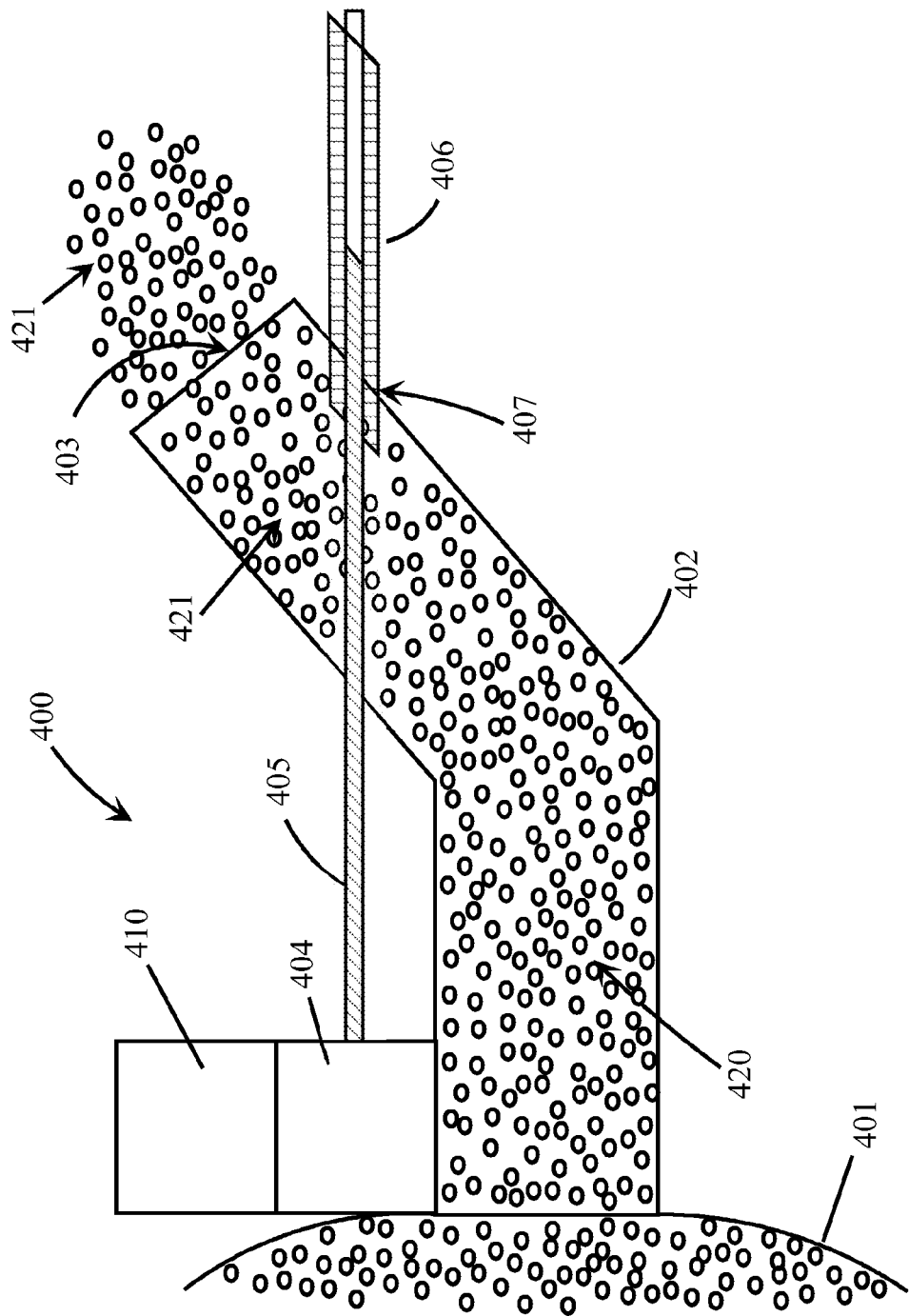

Referring next to FIGS. 4A-4B, there is illustrated an alternative embodiment of the present invention. A dispensing chute 400 is illustrated in a cross-sectioned view attached to an opening or hole in a feed container 401, which is not fluffier illustrated for the sake of simplicity. Regardless of the embodiment of the feed container 401, feed 420 contained within the feed container 401 will be available inside the chute 402 for dispensing out of the open end 403 of the chute 402 as feed 421.

Figure 6:
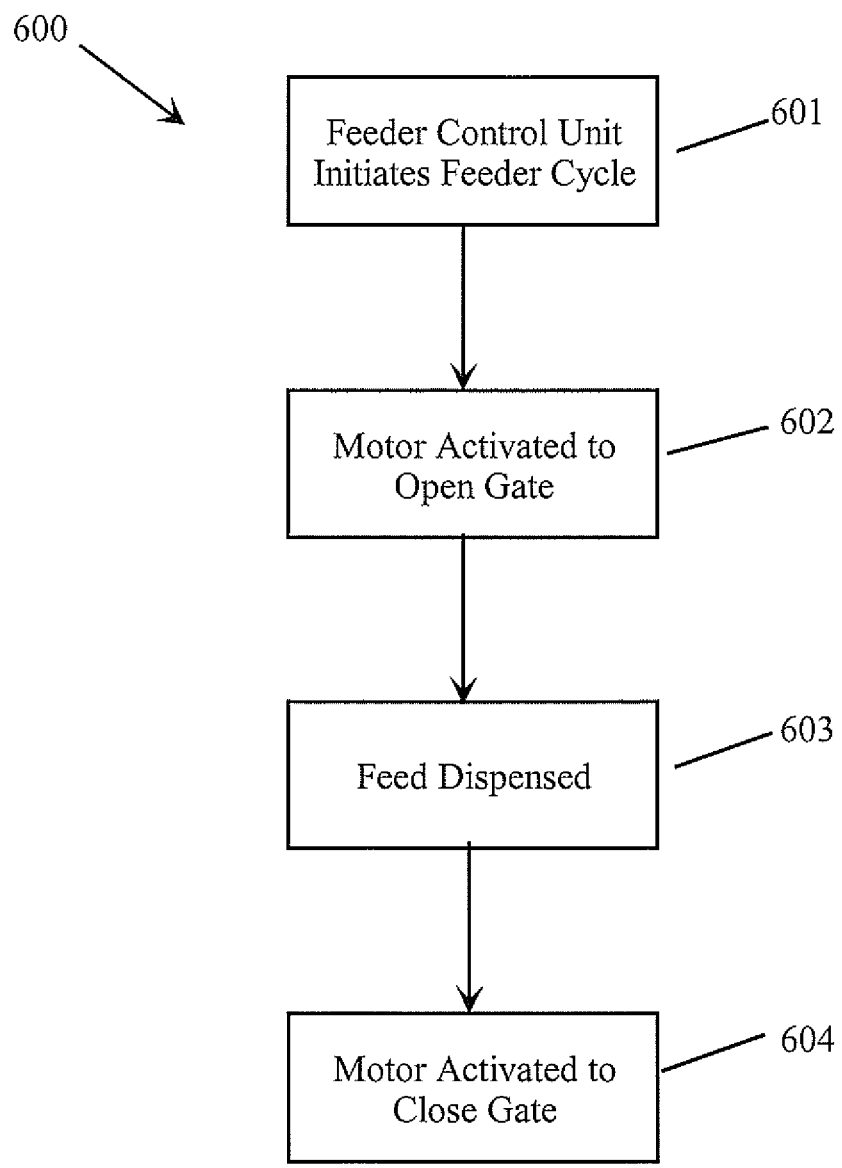

Operation and control of the motor 404, and operation and control of any other motor utilized to dispense the feed 420 from the container 401 through the chute 402, may be controlled with a feeder control unit 460. Referring to FIG. 6, there is illustrated a simplified flow diagram of a process 600 for operating and controlling embodiments of the present invention. Such a process 600 may be implemented within the feeder control unit 460 utilizing mechanical and/or electrical and/or electronic mechanisms. For example, as will be further described with respect to FIG. 7, timing, operation, and control of the process 600 may be implemented with a data processing system, such as a programmed computer/controller. The process 600 may begin in step 601 with the feeder control unit 460 initiating a feeder cycle in which it is programmed for dispensing the animal feed 420 externally from the feeder 400. In step, 602, a motor 404 operates an ACME threaded rod 405, which is threaded through a gate 406, which has a matching ACME nut so that when the ACME threaded rod 405 is turned in one direction, the gate 406 translates sideways to open, such as illustrated in FIG. 4B. In step 603, the feed 420 is dispensed out of the chute 402, such as with another motor (not shown). In step 604, the motor 404 can be reversed so that the gate 406 is drawn back in through the hole 407 to close off the opening 403 of the chute 402 from the feed on the other side of the gate in the chute 402. With such an apparatus, the motor 404 can be operated to open and close the gate 406 in order to open or close of the escape of animal feed 420 from the opening 403 in the chute 402.

The shape of the chute 402 may be cylindrical, rectangular, or other geometrical shape, with the gate 406 matching an inside dimension of the chute 402.

Figure 7:
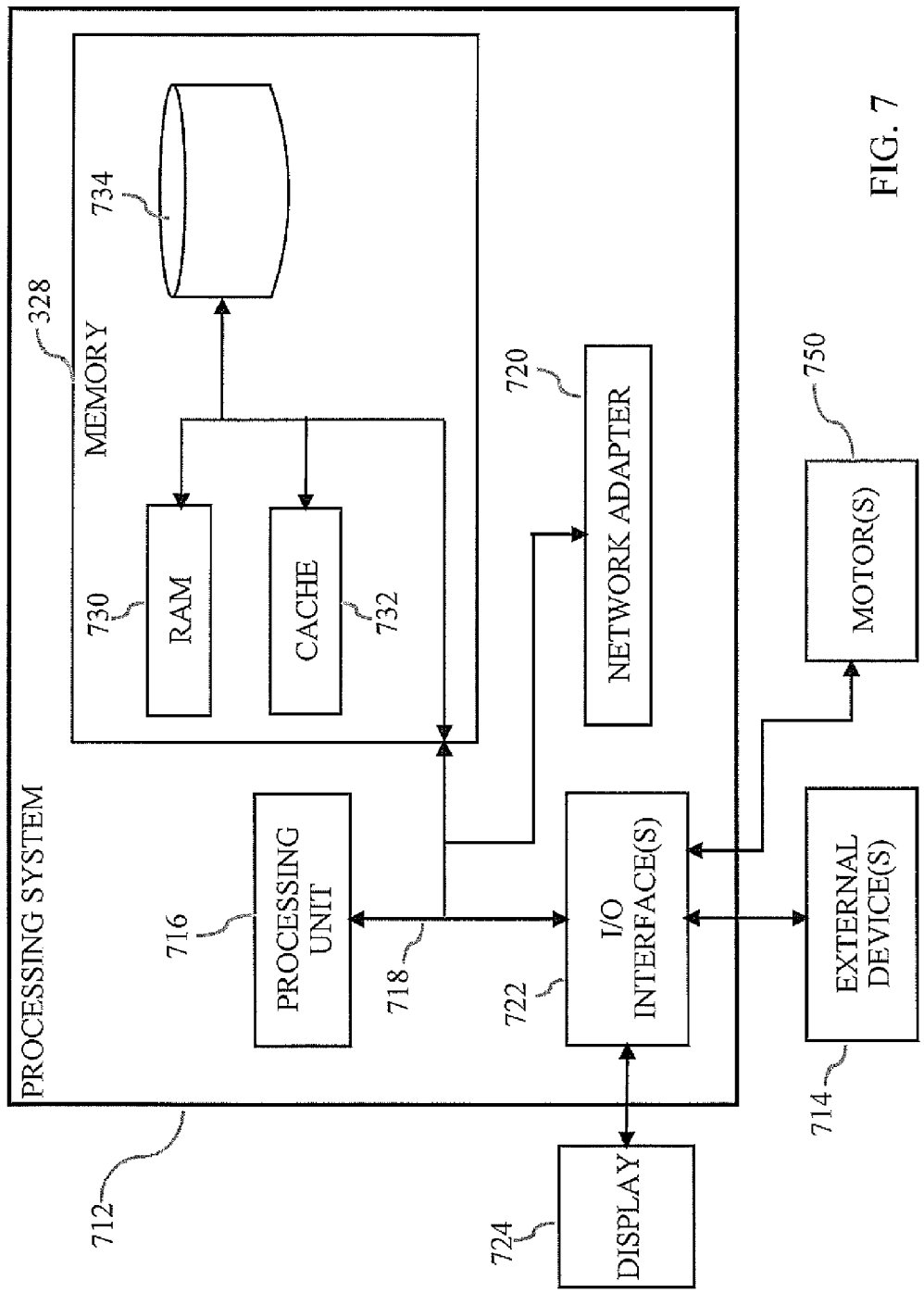
FIG. 7 illustrates a block diagram of an exemplary data processing system/controller configured in accordance with embodiments of the present invention.

Referring to FIG. 7, there is illustrated a block diagram of an exemplary data processing system/controller 712, which may be implemented within the feeder control units 201, 460, such as for operating the processes 500, 600. The components of the system 712 may include, but are not limited to, one or more processors or controllers (e.g., a microcontroller) 716, a system memory 728, and a bus 718 that couples various system components including system memory 728 to the processing unit 716. Embodiments of the present invention are not limited to such a configuration.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ("ISA") bus, Micro Channel Architecture ("MCA") bus, Enhanced ISA ("EISA") bus, Video Electronics Standards Association ("VESA") local bus, and Peripheral Component Interconnects ("PCI") bus.

The system 712 may include a variety of computer system readable media. Such media may be any available media that is accessible by the system 712, and may include both volatile and non-volatile media, and/or removable and non-removable media.

The system memory 728 may include computer system readable media in the form of volatile memory, such as random access memory ("RAM") 770 and/or cache memory 772. The system 712 may further include other removable/non-removable, volatile/non-volatile computer system storage media. By way of example only, the storage system 774 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media may be provided. In such instances, each may be connected to the bus 718 by one or more data media interfaces. As will be further described below, the memory 728 may include at least one program product having a set (e.g., at least one) of program modules that are configured to cavy out the functions of embodiments of the present invention (e.g., processes 500, 600).

The system 712 may also communicate with one or more external devices 714 such as a keyboard, a pointing device, a display 724, etc.; one or more devices that enable a user to interact with the system 712; and/or any devices (e.g., network card, modem, etc.) that enable the system 712 to communicate with one or more other computing devices. Such communication can occur via I/O interfaces 722. Still yet, the system 712 can communicate with one or more networks such as a local area network ("LAN"), a general wide area network ("WAN"), and/or a public network (e.g., the Internet) via a network adapter 720, including in a wireless manner (e.g., Bluetooth). As depicted, a network adapter 720 may communicate with the other components of the system 712 via the bus 718. It should be understood that although not shown, other hardware and/or software components may be used in conjunction with the system 712. Furthermore, the system 712 may communicate with motors 750, such as the motors 203, 404, and the other motors disclosed herein, in order to implement the processes 500, 600.

What is claimed is:

1. A mechanism suitable for dispensing animal feed from a feed container, comprising:
    a motorized animal feed dispenser suitable for dispensing the animal feed and located below the feed container; and
    a housing that automatically moves between open and closed positions,
        wherein in the closed position, the housing is positioned so that it substantially encloses the motorized animal feed dispenser, and
        wherein in the open position, the housing is positioned so that the motorized animal feed dispenser is exposed for dispensing the animal feed to an external area around the feed container.

2. The mechanism as recited in claim 1, wherein the motorized animal feed dispenser comprises a dispenser platform configured to revolve in a manner that spreads the animal feed it receives from the feed container to the external area around the feed container.

3. The mechanism as recited in claim 2, wherein the external area around the feed container comprises surrounding ground over which the feed container is positioned.

4. The mechanism as recited in claim 1, wherein the mechanism comprises a motorized apparatus configured for moving the housing between the open and closed positions.

5. The mechanism as recited in claim 4, wherein the motorized apparatus comprises:
    an electric motor;
    an Acme threaded rod mechanically coupled to the electric motor; and
    an Acme nut in threaded engagement with the Acme threaded rod, wherein the Acme nut is affixed to the housing.

6. The mechanism as recited in claim 1, further comprising a feeder control unit configured to control a time period during which the housing is moved to the open position so that the motorized animal feed dispenser is exposed for dispensing of the animal feed to the external area around the feed container.

7. The mechanism as recited in claim 6, wherein the feeder control unit is configured to move the housing to the closed position after expiration of the time period.

8. The mechanism as recited in claim 1, wherein in the closed position, physical access from outside of the housing to the animal feed residing on the motorized animal feed dispenser is prevented.

9. An animal feeder comprising:
    a feed container suitable for containing animal feed, wherein the feed container includes a hole;
    a motorized animal feed dispenser positioned in proximity to the hole and located below the feed container;
    a housing that automatically moves between open and closed positions,
        wherein in the closed position, the housing is positioned so that it substantially encloses the motorized animal feed dispenser, and
        wherein in the open position, the housing is positioned so that the motorized animal feed dispenser is exposed for dispensing the animal feed it receives through the hole from the feed container to an external area around the animal feeder.

10. The animal feeder as recited in claim 9, wherein the motorized animal feed dispenser comprises a dispenser platform configured to revolve in a controlled manner that spreads the animal feed it receives through the hole from the feed container to surrounding ground over which the animal feeder is positioned.

11. The animal feeder as recited in claim 10, further comprising a feeder control unit configured to control a time period during which the housing is mechanically moved to the open position so that the motorized animal feed dispenser is exposed for dispensing by the dispenser platform of the animal feed it receives through the hole from the feed container to the surrounding ground over which the animal feeder is positioned.

12. The animal feeder as recited in claim 11, wherein the feeder control unit is configured to mechanically move the housing from the closed position to the open position before commencement of the time period, and from the open position to the closed position after expiration of the time period.

13. The animal feeder as recited in claim 12, wherein in the closed position, physical access from outside of the housing to the animal feed residing on the dispenser platform and through the hole is prevented.

14. The animal feeder as recited in claim 13, wherein the animal feeder comprises an apparatus configured for moving the housing between the open and closed positions, wherein the apparatus comprises:
    an electric motor;
    an Acme threaded rod mechanically coupled to the electric motor; and
    an Acme nut in threaded engagement with the Acme threaded rod, wherein the Acme nut is affixed to the housing,
    wherein the mechanical movement of the housing between the open and closed positions is effected by turning of the Acme threaded rod in response to activation of the electric motor, whereby the housing is moved when the threaded engagement of the Acme nut with the Acme threaded rod causes threaded sliding of the Acme nut relative to the Acme threaded rod.

15. A method for spreading of animal feed from an animal feeder onto ground over which the animal feeder is positioned, wherein the animal feeder includes a feed container storing the animal feed, a motorized animal feed dispenser suitable for dispensing the animal feed, and a housing configured for movement between open and closed positions, wherein in the closed position, the housing is positioned so that it substantially encloses the motorized animal feed dispenser, the motorized animal feed dispenser being positioned in proximity to a hole in the feed container through which the animal feed passes externally from the feed container, and wherein in the open position, the housing is positioned so that the motorized animal feed dispenser is exposed for dispensing of the animal feed it receives through the hole from the feed container to an external area around the feed container, the method comprising:

automatically moving the housing from the closed position to the open position;
  maintaining the housing in the open position during a specified time period;
  dispensing, for at least a portion of the specified time period, the animal feed by the motorized animal feed dispenser to the external area around the feed container; and
  after conclusion of the time period, mechanically moving the housing from the open position to the closed position.

16. The method as recited in claim 15, wherein dispensing of the animal feed onto the ground by the motorized animal feed dispenser comprises revolving a dispenser platform in a manner that spreads to the ground the animal feed the dispenser platform receives through the hole from the feed container.

17. The method as recited in claim 16, wherein the closed position, physical access from outside of the housing to the animal feed residing on the dispenser platform and through the hole is prevented.

18. The method as recited in claim 16, wherein the movement of the housing between the open and closed positions comprises mechanically turning, in first and second directions, a threaded rod that is in threaded engagement with a matching threaded nut affixed to the housing.

19. The method as recited in claim 18, wherein the moving the housing from the closed position to the open position comprises turning the threaded rod in the first direction in a manner that causes sliding of the threaded nut relative to the threaded rod whereby the housing is lowered to the open position so that sides of the housing do not block the dispensing of the animal feed from the revolving dispenser platform onto the ground.

20. The method as recited in claim 19, wherein in the closed position, the sides of the housing would completely block the dispensing of the animal feed from the revolving dispenser platform onto the ground.

* * * * *